Aug. 23, 1927.

S. SHAFER, JR 1,640,221

LOADING SKIP FOR CONCRETE MIXERS

Filed May 13, 1926

Inventor
Samuel Shafer Jr.

By John S. Barker
Attorney

Patented Aug. 23, 1927.

1,640,221

UNITED STATES PATENT OFFICE.

SAMUEL SHAFER, JR., OF MILWAUKEE, WISCONSIN, ASSIGNOR TO CHAIN BELT COMPANY, OF MILWAUKEE, WISCONSIN, A CORPORATION OF WISCONSIN.

LOADING SKIP FOR CONCRETE MIXERS.

Application filed May 13, 1926. Serial No. 108,957.

It is customary in the building of concrete roads to charge the concrete paving mixer machine that is used with measured batches of concrete aggregate. These batches are commonly conveyed to the mixing machine in batch boxes, each holding a single measured batch of aggregate, which are transported by trucks or on industrial railway cars from the measuring plant, where the sand and stone to be used in the road construction are stored in bulk, and where frequently the cement is also stored. However, it is sometimes found desirable to stock the cement to be used in conveniently placed piles along the course of the work, and to dump into the loading skip of the mixing machine after each batch of coarse aggregate of sand and stone has been charged into the same, as much cement as is required, taken from one of such piles. This latter procedure is followed where there is so much moisture in the coarse aggregate as to cause the cement, if placed in the batch box at the measuring plant, to take an initial set before it is delivered to and treated in the mixing machine. This is also desirable where, due to high winds, there is the liability of considerable loss of cement while being transported with the coarse aggregate. When the cement is charged into the power loading skip separately from the coarse aggregate I have found that it is very desirable to have a separate receptacle for holding the cement and maintaining it apart and separate from the coarse aggregate until the moment of discharging the skip into the mixer, because when the cement is dumped directly into the skip with the coarse aggregate, or upon the top of the latter after it has been discharged into the skip, more or less of the cement sticks to the sides of the skip, particularly when the coarse aggregate is very damp, thus entailing additional labor to keep the skip clean and the inner walls thereof smooth, so that the charge will slide freely into the mixer when the skip is elevated. By the use of a separate receptacle for the cement the latter can be charged while waiting for the movement of the coarse aggregate to the loading skip, thus saving time, it being understood that the delivery of the cement to the charging skip is usually by hand.

My invention has for its object to improve the construction of the loading skip for concrete mixing machines, by providing the same with a separate receptacle, compartment, or container for the charge of cement, which may be easily charged and wherein it may be maintained entirely separate from the coarse aggregate until the moment the full charge is delivered to the mixing machine.

While my invention is particularly useful in connection with the loading skip for concrete paving machines it will be readily seen that it may be used in connection with concrete mixers of other types.

In the accompanying drawings—

Figure 1:
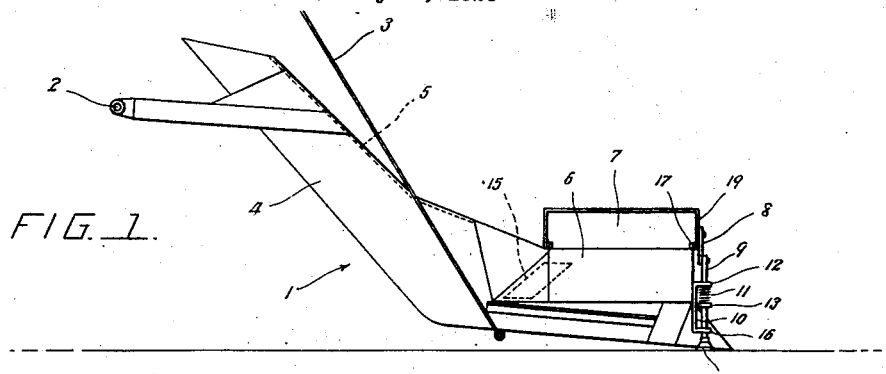
Figure 1 is a side view of a power-operated loading or charging skip for a concrete mixing machine provided with my invention.
Figure 2:
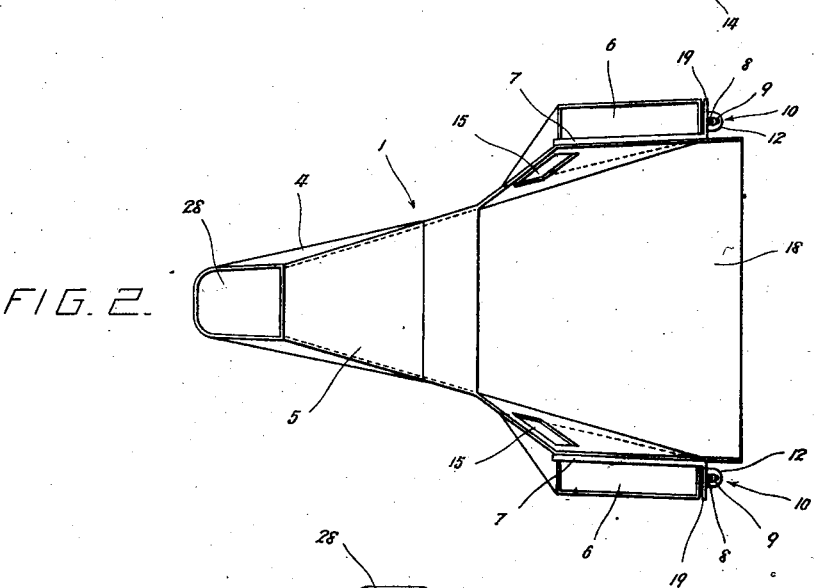
Fig. 2 is a plan view of the same.

Referring to the drawings, 1 designates a loading skip of well known construction. It is arranged to be pivotally connected, as at 2, to the frame of a concrete mixer in connection with which it is used. 3 indicates one of the cables by which the skip is operated in a well known manner.

The skip is formed with a spout section 4, through which the aggregate of solid material which enters into the formation of a batch of concrete is delivered to the rotating drum of the paver or other mixing machine, and with an unobstructed open section 18 having sides flaring toward the rear, into which the entire charge of coarse aggregate for a particular batch may be delivered at one time and operation, from batch boxes, trucks, or otherwise. When the skip is in its lowered position, as represented in Fig. 1, the section 18 rests upon the ground to facilitate its being loaded.

5 indicates a cover for the spout section of the skip, the section 18 being open. At one or both sides of the loading section of the skip is a box or receptacle 6, of a size to contain the amount of cement used in forming the charge of aggregate which the skip is intended to deliver to the mixing machine. It communicates with the section 18 of the skip through an opening 15 formed in the side of the skip, preferably at the base or outer end of the spout section 4 thereof.

It will be readily understood that the cement receptacle 6 may be charged independently of the charging of the section 18 with coarse aggregate, with the incident advantages that have been already herein pointed out; and that when the skip is raised to discharge into the mixing machine the cement will flow from the box or receptacle 6, and will mix with the aggregate from the loading section 18 as the charge flows through the spout 4. By this arrangement there is very little opportunity for the cement to stick to the inner walls of the skip because it is rapidly swept forward by the moving mass of coarse aggregate, and it does not stick to the inner walls of the box or receptacle 6, as this is kept dry.

Figure 3:
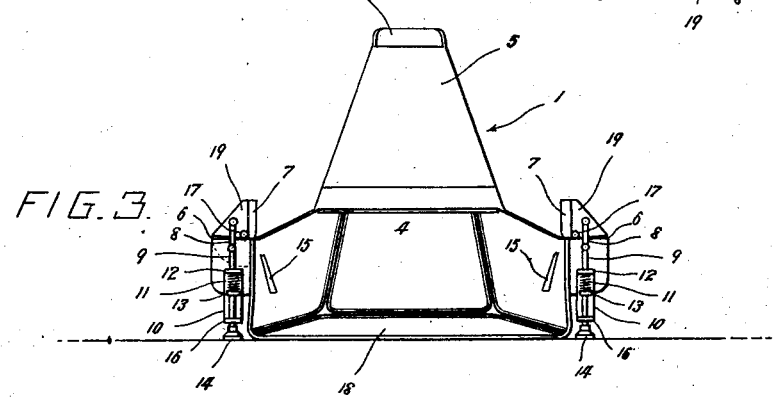
Fig. 3 is a rear or end view.

7 indicates a cover for the receptacle 6. It is preferably hinged to the upper edge thereof along the line of junction between the inner wall of the cement receptacle and the adjacent side wall of the skip, as indicated at 17. The cover is preferably formed with end pieces 19 that somewhat overlie the ends of the receptacle so that the cover serves as a practically water-tight closure for the receptacle when lowered. I provide means for automatically moving the cover 7 and opening the receptacle 6 when the skip is lowered to position to receive its charge, as represented in Fig. 1. 10 designates a bracket secured to one end of the receptacle 6. It is formed with outwardly extending lugs or flanges 12, 16, that are perforated to receive a rod 9, the rod being free to move in the said lugs which serve as guides therefor. A coiled spring 11 surrounds the rod 9, being located between a collar 13 on the rod and the upper lug or flange 12. This spring tends to move the rod downwardly. The rod is provided at its lower end with a foot 14 which is adapted to engage with the ground, or with some contact piece placed on the ground, when the skip is lowered to charge receiving position, and by reason of such engagement the rod 9 is moved upwardly, compressing the spring 11. The upper end of the rod is connected by a link 8 with one end 19 of the cover. It will be seen that under normal conditions, that is, except when the skip is lowered and the foot of the rod 9 is in engagement with the ground or some contact piece supported thereon, the door of the cement box is closed, being moved to closing position and there held by the spring 11, acting through the rod 9 and link 8. When, however, the skip is in use and is lowered to its charging position, the foot 14 comes into engagement with the ground, or other object, and is thereby raised sufficiently to lift the cover 7 to the position indicated in Figs. 1 and 3. This arrangement makes it unnecessary to manually lift the cover each time the cement box is to be charged, and yet provides means for closing such box against rain or other material, the entrance of which into the box would be undesirable. It also prevents the cement from being blown away or falling out of the box and scattered while the loading skip is being lifted into position to discharge into the mixing drum.

What I claim is:

1. The combination with a charging skip for a concrete mixer formed with an unobstructed section into which the entire mass of coarse aggregate of the charge may be delivered at one operation, and a spout section through which such aggregate is discharged to the concrete mixer, of a separate receptacle for the cement that enters into the charge located at one side of the skip and communicating therewith through an opening in the side wall of the skip.

2. The combination with a charging skip for a concrete mixer formed with a large unobstructed open section into which the coarse aggregate of the charge is delivered, having side walls that flare toward the rear, and a spout section through which the aggregate is discharged into the concrete mixer when the skip is tilted, of a separate receptacle for the cement that enters into the charge located at one side of the skip and communicating therewith through an opening in the flaring side wall thereof, the opening being located at the base or rear of the spout whereby when the skip is tilted the cement flows from such receptacle through the said opening and is carried forward by, and caused to mix with, the moving coarse aggregate.

3. The combination stated in claim 1 having the cement receptacle provided with a cover adapted to close the receptacle practically water tight except when open for filling.

4. The combination stated in claim 1, having the cement receptacle provided with a cover to close the same practically water tight except when opened for filling, and including also means for automatically raising the cover to open the receptacle when the skip comes to position to receive its charge.

5. The combination with a charging skip for a concrete mixer, of a separate receptacle for the cement of the charge, a cover for the receptacle arranged to normally close the receptacle, and means for lifting the cover to open the receptacle arranged to contact with the ground when the skip comes to position to receive its charge.

6. The combination with a charging skip for a concrete mixer, of a separate receptacle for the cement of the charge, a cover for the receptacle, a movable rod connected with the cover, a guide for the rod, and a spring acting on the rod to hold the cover closed, the rod being extended beyond its guide to engage with the ground when the skip comes to position to receive its charge.

SAMUEL SHAFER, Jr.